(No Model.)

L. PRIMEAU.
HAY PRESS.

No. 515,013. Patented Feb. 20, 1894.

Witnesses:
G. J. H. Lemaître.
K. Foley

L. Primeau
Inventor
Per J. Coursolle
Attorney.

UNITED STATES PATENT OFFICE.

LOUIS PRIMEAU, OF BEAUHARNOIS, CANADA.

HAY-PRESS.

SPECIFICATION forming part of Letters Patent No. 515,013, dated February 20, 1894.

Application filed May 11, 1893. Serial No. 473,827. (No model.) Patented in Canada December 19, 1892, No. 41,319.

*To all whom it may concern:*

Be it known that I, LOUIS PRIMEAU, a subject of the Queen of Great Britain, residing at Beauharnois, in the county of Beauharnois, in the Province of Quebec, Canada, have invented certain new and useful Improvements in Hay-Presses, (for which I have obtained a patent in Canada, No. 41,319, dated December 19, 1892;) and I do hereby declare that the following is a full, clear, and exact description of the same, reference being had to the accompanying drawings, forming a part hereof.

The object of my invention is to provide a strong and efficient hay baling press, that is simple in construction and easily operated.

Figure 1:
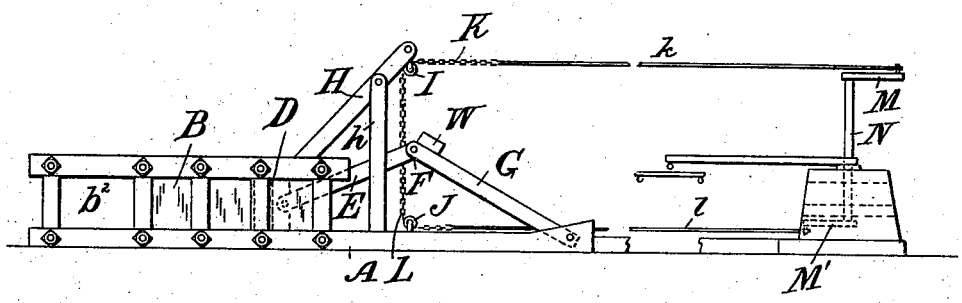
Figure 2:
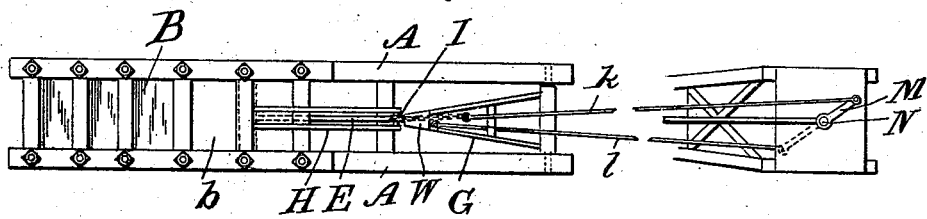
Figure 3:
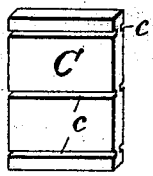

In the drawings,—Figure 1 is a side elevation of my improved press. Fig. 2 is a top view of the same. Fig. 3 is a top view of the tail board.

A A are two longitudinal sills on one end of which is constructed the box B of the press, strongly bolted together and provided with the feed opening $b$. Openings $b^2$ are made in the sides near the outlet end. The tailboard C is constructed with grooves $c$ as shown in Fig. 3 for convenience of placing the wires. The piston or plunger D has pivoted to its outer end, a rod E. The other end F of this rod is pivoted to one end of a frame G constituting a toggle-joint, which has its other end pivoted in the sills as shown in Fig. 1; thus by raising and lowering the joint at F the plunger D is pulled out or pushed in. In order to operate the joint I make use of the following device:

On the plunger end of the box B, I secure an arm H supported by the standards $h$, a pulley I is journaled in this arm H above the joint F, and a pulley J is journaled between the two sills under the joint F. The ends of two chains K and L are secured to the joint F one passing over the pulley I and the other over the pulley J. These chains have their free ends connected by rods $k$, $l$, to the arms M, M', of the vertical shaft N of a horse power, thus as the shaft is rotated, the arms M, M', which are placed on opposite sides of the shaft N, alternately pull the chains K, L, alternately raising and lowering the joint F, thus compressing the hay in the box. A weight W is attached to the joint F which tends to equalize the strain, by making the light upward movement heavier and helping to put on pressure on the downward movement.

Both the power and press may be mounted on wheels and the horse power may be replaced by a hand winch when only a small amount of work is to be done.

I claim as my invention—

In a hay press the combination with a suitable box having feed and outlet openings and plunger operated by a toggle-joint, of the chains K and L each secured by one end to the said toggle joint, pulleys J and I over which the said chain passes, rods $k$ and $l$ connecting the said chains to the arms M M', the arms M M' secured on a vertical rotatable shaft N, substantially as set forth.

Signed at Ottawa, this 24th day of April, 1893.

LOUIS PRIMEAU.

In presence of—
G. J. H. LEMAÎTRE,
K. FOLEY.